(12) United States Patent
Menzel et al.

(10) Patent No.: US 8,603,353 B2
(45) Date of Patent: Dec. 10, 2013

(54) THERMAL INSULATION MATERIAL COMPRISING PRECIPITATED SILICA

(75) Inventors: Frank Menzel, Hanau-Steinheim (DE); Karl Meier, Alfter (DE); Christian Panz, Wesseling-Berzdorf (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/148,679

(22) PCT Filed: Jan. 21, 2010

(86) PCT No.: PCT/EP2010/050678
§ 371 (c)(1),
(2), (4) Date: Aug. 10, 2011

(87) PCT Pub. No.: WO2010/091921
PCT Pub. Date: Aug. 19, 2010

(65) Prior Publication Data
US 2011/0315912 A1 Dec. 29, 2011

(30) Foreign Application Priority Data

Feb. 13, 2009 (EP) .................................... 09152833

(51) Int. Cl.
*E04B 1/74* (2006.01)
(52) U.S. Cl.
USPC ........................................................ 252/62
(58) Field of Classification Search
USPC .................... 252/62; 423/355; 428/68, 69
See application file for complete search history.

(56) References Cited

U.S. PATENT DOCUMENTS

| 4,636,415 | A |   | 1/1987 | Barito et al. |
|---|---|---|---|---|
| 4,681,788 | A | * | 7/1987 | Barito et al. ..................... 428/68 |
| 4,798,753 | A | * | 1/1989 | Abuaf et al. .................... 428/69 |
| 5,376,449 | A |   | 12/1994 | Harris et al. |
| 5,395,604 | A |   | 3/1995 | Harris et al. |
| 2005/0165161 | A1 | * | 7/2005 | Igarashi et al. ............... 524/865 |
| 2007/0286788 | A1 |   | 12/2007 | Panz et al. |
| 2007/0299203 | A1 | * | 12/2007 | Panz et al. ..................... 524/588 |
| 2008/0173739 | A1 |   | 7/2008 | Meier et al. |
| 2009/0136672 | A1 | * | 5/2009 | Panz et al. .................. 427/397.7 |

FOREIGN PATENT DOCUMENTS

| CA | 1290677 | 10/1991 |
|---|---|---|
| EP | 1 860 067 | 11/2007 |
| GB | 2 256 192 | 12/1992 |
| JP | 2002-525543 | 8/2002 |
| JP | 2002-544453 A | 12/2002 |

OTHER PUBLICATIONS

Heley et al., 'Fine low density siilica powders prepared by supercritical drying of gels derived from silicon tetrachloride', 1995, Journal of Non-Crystalline Solids, 186, pp. 30-36.*
International Search Report issued Oct. 4, 2010 in PCT/EP10/50678 filed Jan. 21, 2010.
Office Action issued Jan. 22, 2013 in Canadian Patent Application No. 2,752,248.

* cited by examiner

*Primary Examiner* — Emily Le
*Assistant Examiner* — Lynne Edmondson
(74) *Attorney, Agent, or Firm* — Oblon, Spivak, McClelland, Maier & Neustadt, L.L.P.

(57) ABSTRACT

A thermal insulation material comprising a precipitated silica having a modified tapped density of less than or equal to 70 g/l.

18 Claims, 6 Drawing Sheets

THERMAL INSULATION MATERIAL COMPRISING PRECIPITATED SILICA

This invention relates to a thermal insulation material comprising a precipitated silica and mouldings comprising the thermal insulation material.

The development of insulation materials including materials for cooling, heating, and temperature storing structures, is extensively studied. Many systems have been developed using fibrous and powder products or foams.

The use of silica, either a precipitated silica or a fumed silica is described in several patent applications. Fumed silica, which is produced by flame hydrolysis or flame oxidation of silane material, e.g. silicon tetrachloride, as fluffy powder, usually gives better results in thermal insulation applications compared to a precipitated silica.

Precipitated silicas are usually formed by the interaction of an alkaline water glass and a mineral acid, by means well known in the art. They may be subsequently mechanically processed, such as by spray drying and milling. Normally precipitated silicas are lower in cost than their fumed counterparts. Their use as thermal insulation material is disclosed for instance in U.S. Pat. No. 4,636,415, EP 355295, EP 396961 or in EP 463311. However, the performance of the precipitated silicas as thermal insulation material failed to live up to expectations.

It was therefore an object of the present invention to provide a cost-efficient thermal insulation material which performs comparable to one comprising fumed silica. It is a further object of the invention to provide a moulding comprising the thermal insulation material.

Figure 1:
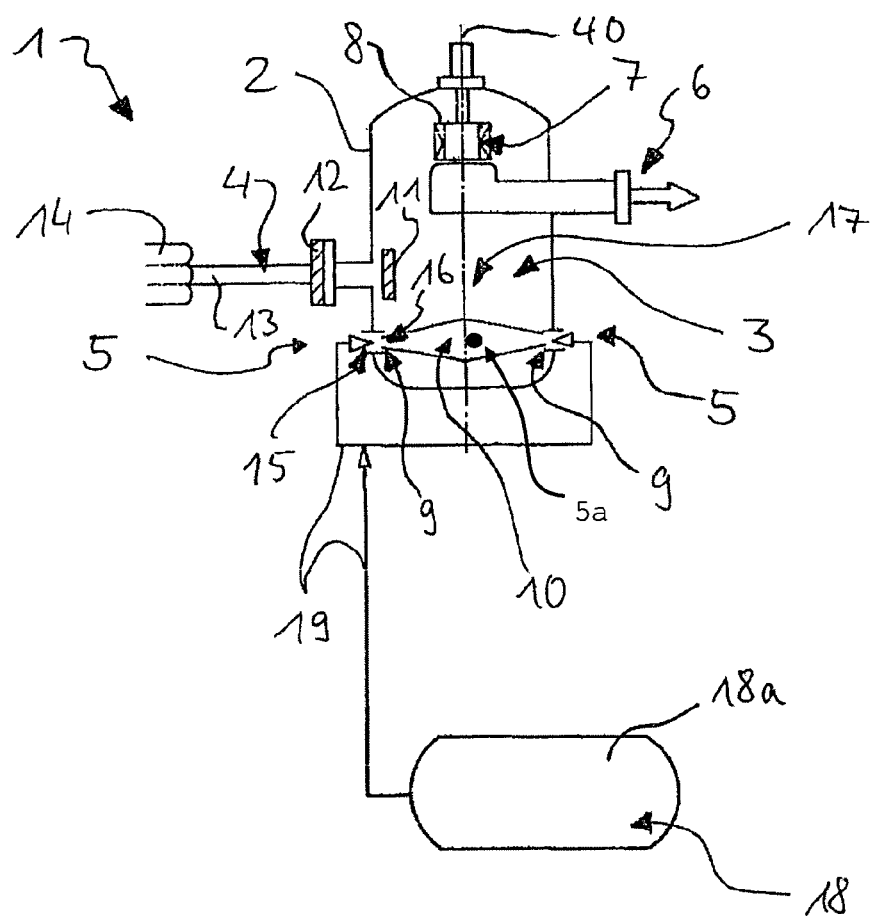
FIG. 1 shows a schematic diagram of a fluid-bed opposed-jet mill according to one embodiment of the invention.

The invention provides a thermal insulation material comprising a precipitated silica having a modified tapped density of less than or equal to 70 g/l, preferably of 1 to 60 g/l, more preferably of 5 to 55 g/l, very preferably of 10 to 50 g/l, and in particular of 10 to 30 g/l.

"Modified tapped density" is understood to mean a tapped density which is achieved by a defined loosening of the silica structure before a conventional tapped density determination according to DIN EN ISO 787-11. This is done to avoid false numbers triggered by preliminary compaction of the precipitated silica. Details will be given later in the description.

In a special embodiment of the invention the precipitated silica of the thermal insulation material has a a) $d_{50}$-value of from 150 to 2000 nm, preferably of from 200 to 1500 nm, more preferably of from 250 to 1200 nm, most preferably of from 300 to 900 nm and particular preferred of from 350 to 600 nm, b) $d_{90}$-value of from 500 to 7000 nm, preferably of from 700 to 6500 nm, more preferably of from 800 to 6000 nm, most preferably of from 900 to 6000 nm and particular preferred of from 1000 to 5000 nm and c) silanol group density of from 2.5 to 80H/nm$^2$, preferably of from 2.6 to 70H/nm$^2$, more preferably of from 2.7 to 60H/nm$^2$, most preferably of from 2.8 to 5.5 OH/nm$^2$ and particular preferred of from 3.1 to 50H/nm$^2$.

The $d_{50}$ and $d_{90}$ values are determined by laser diffraction. The silanol group density is determined by reaction of the precipitated silica with lithium aluminium hydride. Details of each determination will be given later in the description.

In a further embodiment of the invention the BET-surface area of the precipitated silica preferably is of from 100 to 350 m$^2$/g, preferably of from 100 to 350 m$^2$/g, more preferably 110 to 340 m$^2$/g, most preferably 120 to 330 m$^2$/g, especially preferred 130 to 300 m$^2$/g and very particular preferred 145 to 280 m$^2$/g.

In further embodiments of the invention the loss on drying of the precipitated silica is of from 1.5 to 8% by weight and/or a loss on ignition is of from 1.5 to 9% by weight and the pH-value of the precipitated silica is of from 4 to 9.

In special embodiments the thermal insulation material according to the invention may comprise 30 to 100 wt.-% of the precipitated silica. Thus the precipitated silica can act as thermal insulation material alone. Preferably the thermal insulation material comprises 30 to 95 wt.-%, more preferably 40 to 80 wt.-%, based on the thermal insulation material.

The silica of the present invention can be prepared by milling and classifying a precipitated silica having a Sears number of from 10 to 30 ml/(5 g), preferably 10 to 25 ml/(5 g), a BET-surface of from 100 to 350 m$^2$/g, preferably 130 to 300 m$^2$/g, a loss on drying of from 2 to 8% by weight, preferably 2 to 7% by weight, more preferably 2.5 to 6% by weight, a loss on ignition of from 2 to 9% by weight, preferably 2 to 7% by weight, more preferably 2.5 to 5% by weight, a pH-value of from 4 to 9, preferably 4 to 8, more preferably 5 to 8, and a DBP-value of from 230 to 400 g/100 g, preferably of from 250 to 350 g/100 g.

with a grinding system (grinding apparatus), particular preferred a grinding system comprising a jet mill, characterized in that the mill of the grinding system is operated in the grinding phase with an operational medium selected from the group consisting of gas and/or vapour, preferably steam, and/or a gas comprising steam, and in that the grinding chamber is heated in a heating phase, i.e. before the actual operation with the operational medium, such that the temperature in the grinding chamber and/or at the mill outlet is higher than the dew point of the vapour and/or operational medium and in that the milled silica is classified to a $d_{50}$-value of from 150-2000 nm and a $d_{90}$-value of from 500-7000 nm. Commercially available silica suitable as starting materials are Sipernat 160, Sipernat 22, Sipernat 22 S, Sipernat 22 LS of Evonik Degussa GmbH, Germany, and a silica grade called YH 350, of DWS, China.

Grinding takes place with particular preference in accordance with the method described in WO 2008046727, using the grinding system (mill) described therein the operational medium used being, with especial preference, steam. U.S. patent application Ser. No. 11/944,851, filing date 26 Nov. 2007 is incorporated herein by reference.

In FIG. 1, the reference numerals are as follows: jet mill (1), cylindrical housing (2), grinding chamber (3), feed of material to be grinded (milled) (4), grinding jet inlet (5), heating opening or nozzle (5a), product outlet (6), air classifier (7), classifying wheel (8), inlet opening or inlet nozzle (9), grinding jet (10), heat source (11), heat source (12), supply pipe (13), thermal insulation jacket (14), inlet (15), outlet (16), centre of grinding chamber (17), reservoir or generating means (18), a tank (18a) and pipe installations (19).

Figure 2:
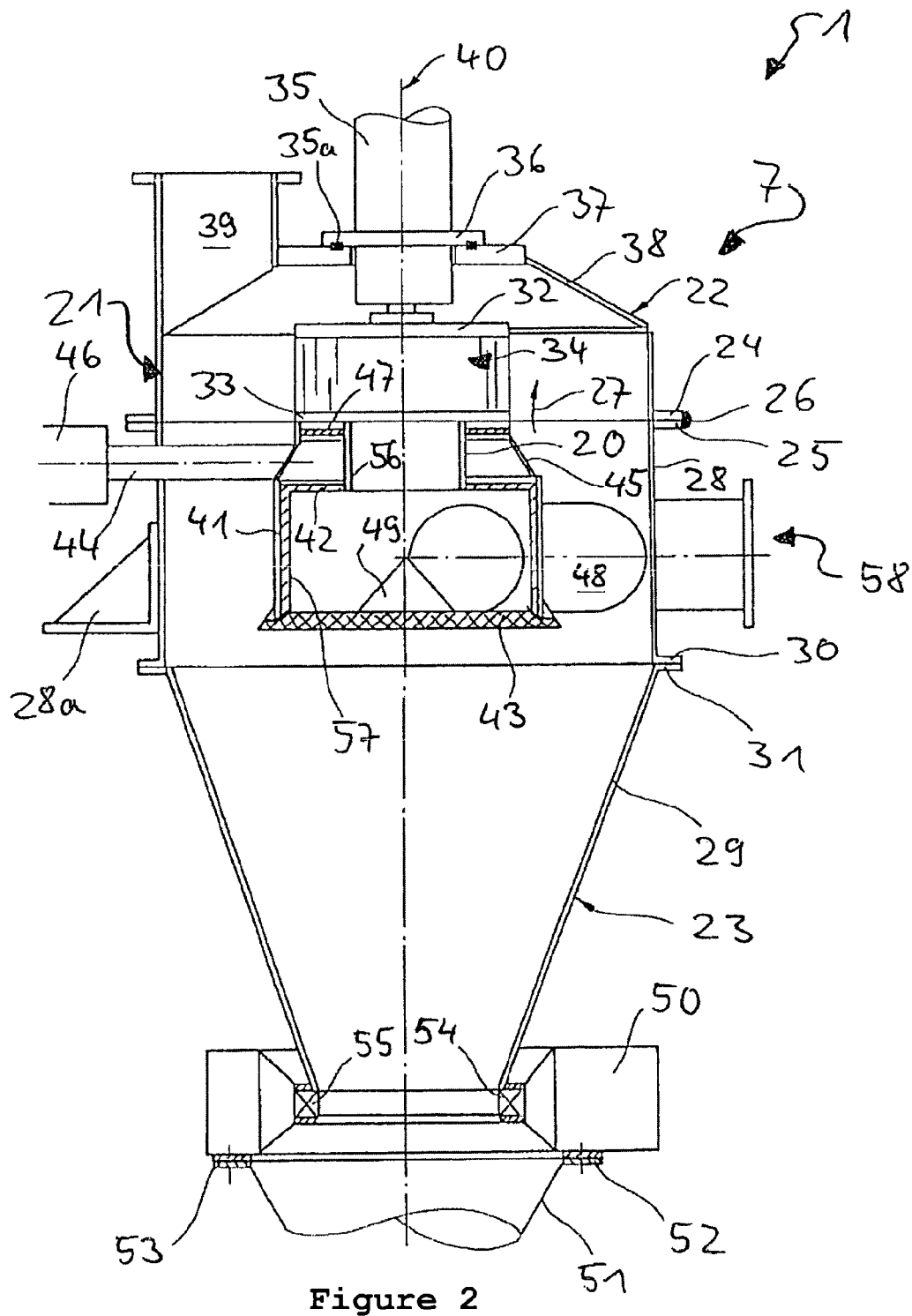
FIG. 2 shows a schematic diagram of a dynamic pneumatic classifier according to an embodiment of the invention.

In FIG. 2, the reference numerals are as follows: jet mill (1), air classifier (7), classifier gap (8a), exit port (immersed pipe) (20), classifier housing (21), top housing part (22), Bottom housing part (23), circumferential flange (24), circumferential flange (25), articulated joint (26), arrow (27), classifier chamber housing (28), carrying arms (28a), discharge cone (29), Flange (30), Flange (31), cover plate (32), cover plate (33), paddle (34), classifying wheel shaft (35), pivot bearing (35a), shaft lead-through (35b), top machined plates (36), Bottom machined plate (37), end section of housing (38), product feed port (39), axis of rotation (40), outlet chamber (41), top cover plate (42), removable lid (43), carrying arms (44), conical annular housing (45), intake filter (46), perforated plate (47), fines discharge pipe (48), deflection cone (49), classifying air entry coil (50), coarse material discharge (51), flange (52), flange (53), dispersion zone (54), flange machined (bevelled) at the inside edge, and lining (55), replaceable protection pipe (56), replaceable protection pipe (57), fines exit/outlet (58).

Figure 3:
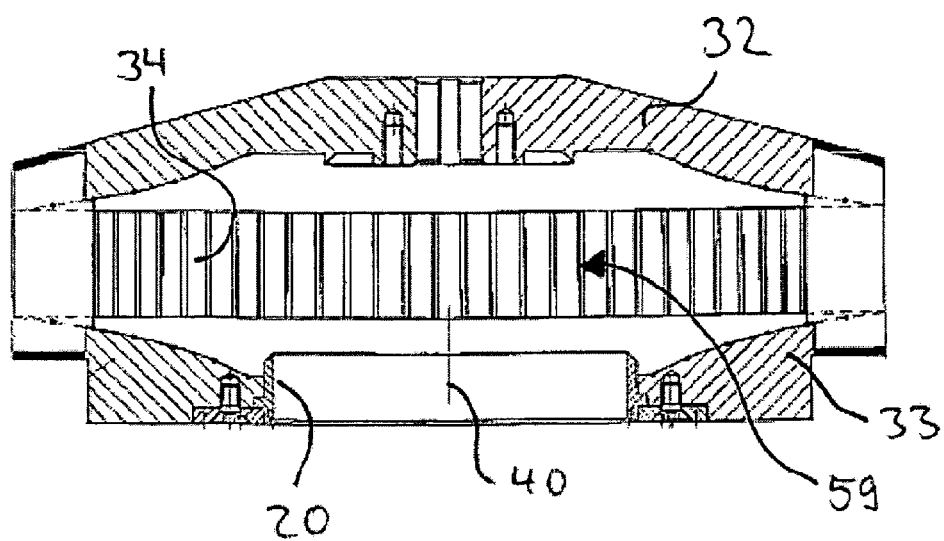
FIG. 3 shows a schematic diagram of a dynamic pneumatic classifier according to an embodiment of the invention.

In FIG. 3, the reference numerals are as follows: classifier gap (8a), exit port (immersed pipe) (20), cover plate (32), cover plate (33), paddle (34), shaft lead-through (35b), axis of rotation (40), ring of paddles (59).

Figure 4:
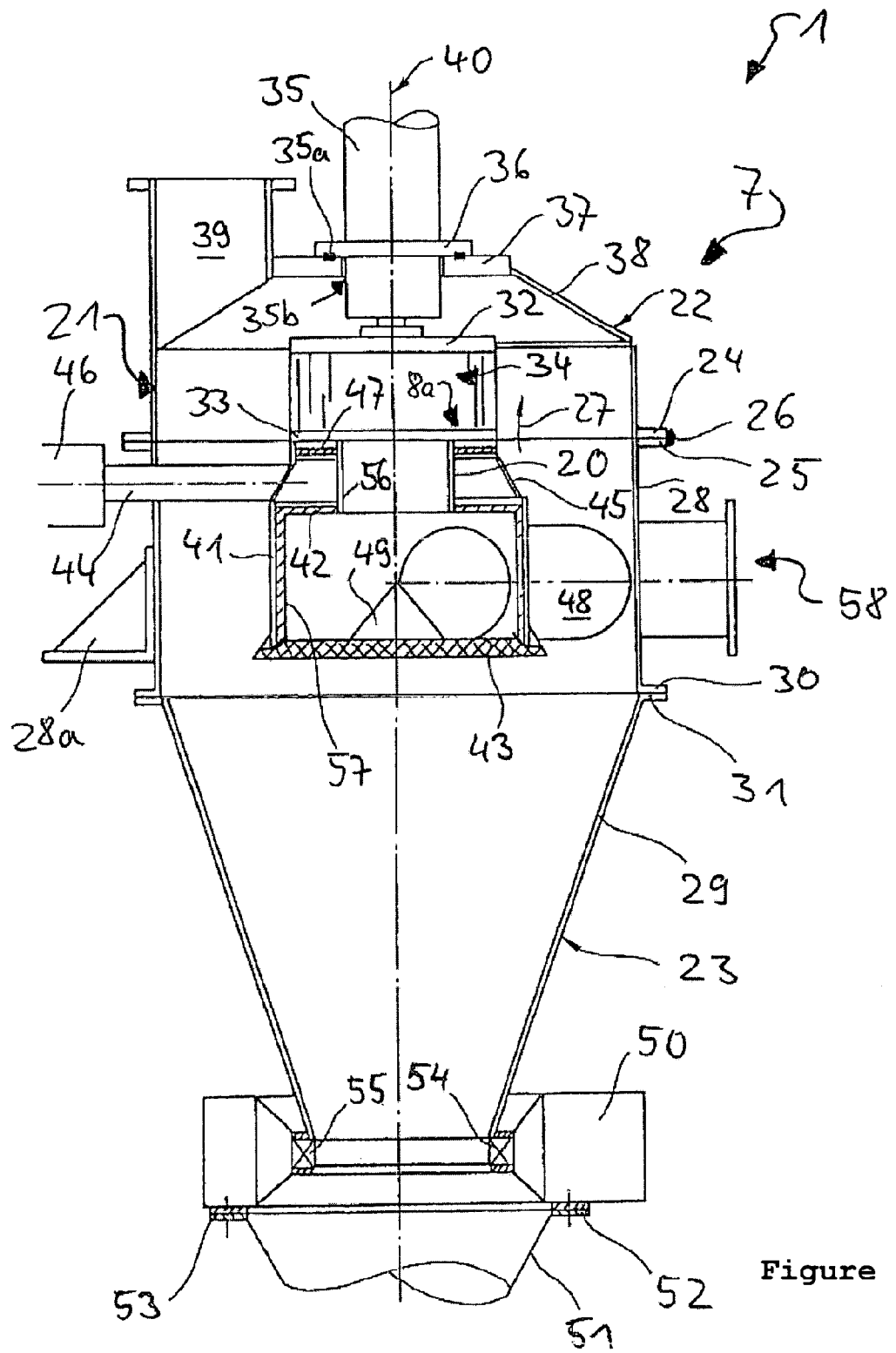
FIG. 4 shows a schmatic diagram of a fluid-bed opposed-jet mill with integrated dynamic pneumatic classifier according to an embodiment of the invention.

In FIG. 4, the reference numerals are as follows: jet mill (1), air classifier (7), exit port (immersed pipe) (20), classifier housing (21), top housing part (22), Bottom housing part (23), circumferential flange (24), circumferential flange (25), articulated joint (26), arrow (27), classifier chamber housing (28), carrying arms (28a), discharge cone (29), Flange (30), Flange (31), cover plate (32), cover plate (33), paddle (34), classifying wheel shaft (35), pivot bearing (35a), top machined plates (36), Bottom machined plate (37), end section of housing (38), product feed port (39), axis of rotation (40), outlet chamber (41), top cover plate (42), removable lid (43), carrying arms (44), conical annular housing (45), intake filter (46), perforated plate (47), fines discharge pipe (48), deflection cone (49), classifying air entry coil (50), coarse material discharge (51), flange (52), flange (53), dispersion zone (54), flange machined (bevelled) at the inside edge, and lining (55), replaceable protection pipe (56), replaceable protection pipe (57), fines exit/outlet (58).

Figure 5:
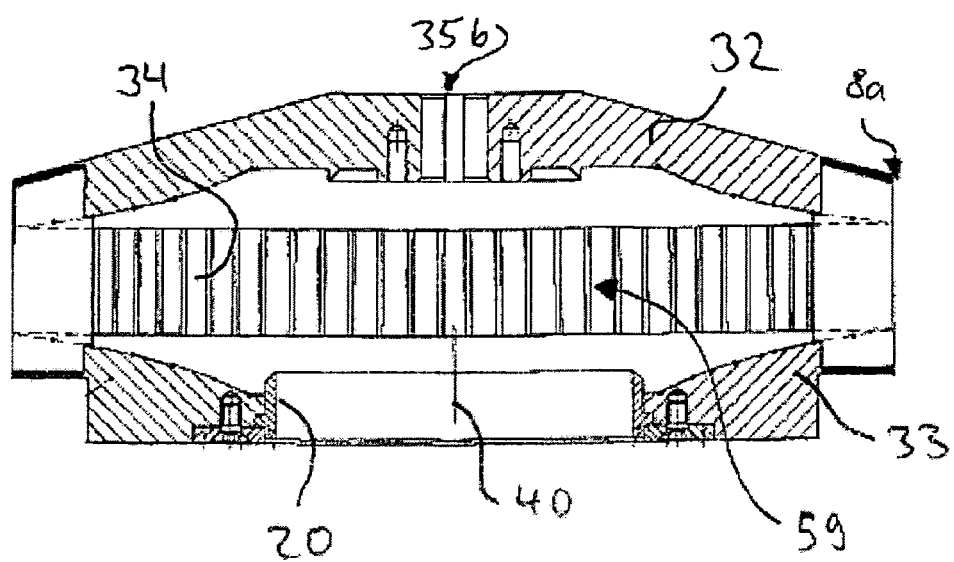
FIG. 5 shows a schematic diagram of a dynamic pneumatic classifier according to an embodiment of the invention.

In FIG. 5, the reference numerals are as follows: exit port (immersed pipe) (20), cover plate (32), cover plate (33), paddle (34), axis of rotation (40), ring of paddles (59).

In one especially preferred embodiment, in preparation for actual grinding with superheated steam, a fluid-bed opposed-jet mill as shown in FIG. 1, with an integrated dynamic pneumatic classifier as shown in FIGS. 2 and 3, is first heated via the two heating openings or nozzles (5a) (of which only one is depicted in FIG. 1) which are charged with hot compressed air, preferably at 10 bar and 160° C., until the mill exit temperature is higher than the dew point of the steam and/or operational medium, preferably about 105° C.

Connected downstream of the mill, for the separation of the ground material, is a filter system (not shown in FIG. 1) whose filter housing is heated in its lower third indirectly, via attached heating coils, by means of saturated steam (preferably 6 bar saturated steam), likewise for the purpose of preventing condensation. All of the apparatus surfaces in the region of the mill, the separation filter, and the supply lines for steam and hot compressed air have special insulation.

After the desired heating temperature has been reached, the supply of hot compressed air to the heating nozzles is shut off and the charging of the three grinding nozzles with superheated steam, preferably at 38 bar (abs) and 325° C., is commenced.

In order to protect the filter medium used in the separation filter and also in order to set a defined level of residual water in the ground material, of preferably 2% to 6%, water is introduced in the starting phase, and during grinding, into the grinding chamber of the mill, via a two-fluid nozzle operated with compressed air, as a function of the mill exit temperature.

The feed quantity is regulated as a function of the current flow of the classifier engine. The current flow regulates the feed quantity such that it is not possible to exceed approximately 70% of the nominal current flow.

The introduction member (4) which functions here is a speed-regulated bucket wheel which meters the feed material from a reservoir container via a cyclical lock, which serves as a barometric endpoint, into the grinding chamber, which is at superatmospheric pressure.

The coarse material is comminuted in the expanding steam jets (grinding gas). Together with the depressurized grinding gas, the product particles ascend in the centre of the mill vessel to the classifying wheel. Depending on the classifier speed and grinding steam quantity which have been set, the particles whose fineness is sufficient enter along with the grinding steam into the fines exit, and from there they pass into the downstream separating system, while particles which are too coarse pass back into the grinding zone and are subjected to a repeat comminuting. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determines the fineness of the particle-size distribution function and also the upper particle-size limit.

In a preferred embodiment, grinding is carried out as follows. The process according to the invention is carried out in a milling system (milling apparatus), preferably in a milling system comprising a jet mill, particularly preferably comprising an opposed jet mill. For this purpose, a feed material to be comminuted is accelerated in expanding gas jets of high velocity and comminuted by particle-particle impacts. Very particularly preferably used jet mills are fluidized-bed opposed jet mills or dense-bed jet mills or spiral jet mills. In the case of the very particularly preferred fluidized-bed opposed jet mill, two or more milling jet inlets are present in the lower third of the milling chamber, preferably in the form of milling nozzles, which are preferably present in a horizontal plane. The milling jet inlets are particularly preferably arranged at the circumference of the preferably round milling container so that the milling jets all meet at one point in the interior of the milling container. Particularly preferably, the milling jet inlets are distributed uniformly over the circumference of the milling container. In the case of three milling jet inlets, the space would therefore be 120° in each case.

In a special embodiment of the process according to the invention, the milling system (milling apparatus) comprises a classifier, preferably a dynamic classifier, particularly preferably a dynamic paddle wheel classifier, especially preferably a classifier according to FIGS. 4 and 5.

In a particularly preferred embodiment, a dynamic air classifier according to FIGS. 2 and 3 is used. This dynamic air classifier contains a classifying wheel and a classifying wheel shaft and a classifier housing, a classifier gap being formed between the classifying wheel and the classifier housing and a shaft lead-through being formed between the classifying wheel shaft and the classifier housing, and is characterized in that flushing of classifier gap and/or shaft lead-through with compressed gases of low energy is effected.

When using a classifier in combination with the jet mill operated under the conditions according to the invention, a limit is imposed on the oversize particles, the product particles ascending together with the expanded gas jets being passed from the centre of the milling container through the classifier, and the product which has a sufficient fineness then being discharged from the classifier and from the mill. Particles which are too coarse return to the milling zone and are subjected to further comminution.

In the milling system, a classifier can be connected as a separate unit downstream of the mill, but an integrated classifier is preferably used.

This particular preferred grinding process according to the present invention comprises a heat-up phase which is included upstream of the actual milling step, in which heat-up phase it is ensured that the milling chamber, particularly preferably all substantial components of the mill and/or of the milling system on which water and/or steam could condense, is/are heated up so that its/their temperature is above the dew point of the vapour. The heating up can in principle be effected by any heating method. However, the heating up is preferably effected by passing hot gas through the mill and/or the entire milling system so that the temperature of the gas is higher at the mill exit than the dew point of the vapour. Particularly preferably, it is ensured that the hot gas preferably sufficiently heats up all substantial components of the mill and/or of the entire milling system which come into contact with the steam.

The heating gas used can in principle be any desired gas and/or gas mixtures, but hot air and/or combustion gases and/or inert gases are preferably used. The temperature of the hot gas is above the dew point of the steam.

The hot gas can in principle be introduced at any desired point into the milling chamber. Inlets or nozzles are preferably present for this purpose in the milling chamber. These inlets or nozzles may be the same inlets or nozzles through which the milling jets are also passed during the milling phase (milling nozzles). However, it is also possible for separate inlets or nozzles (heating nozzles) through which the hot gas and/or gas mixture can be passed to be present in the milling chamber. In a preferred embodiment, the heating gas or heating gas mixture is introduced through at least two, preferably three or more, inlets and nozzles which are arranged in a plane and are arranged at the circumference of the preferably round mill container in such a way that the jets all meet at one point in the interior of the milling container. Particularly preferably, the inlets or nozzles are distributed uniformly over the circumference of the milling container.

During the milling, a gas and/or a vapour, preferably steam and/or a gas/steam mixture, is let down through the milling jet inlets, preferably in the form of milling nozzles, as operating medium. This operating medium has as a rule a substantially higher sound velocity than air (343 m/s), preferably at least 450 m/s. Advantageously, the operating medium comprises steam and/or hydrogen gas and/or argon and/or helium. It is particularly preferably superheated steam. In order to achieve very fine milling, it has proved particularly advantageous if the operating medium is let down into the mill at a pressure of 15 to 250 bar, particularly preferably of 20 to 150 bar, very particularly preferably 30 to 70 bar and especially preferably 40 to 65 bar. The operating medium also particularly preferably has a temperature of 200 to 800° C., particularly preferably 250 to 600° C. and in particular 300 to 400° C. The pressure includes all values and sub values there between, especially including 20, 40, 60, 80, 100, 120, 140, 160, 180, 200, 220 and 240 bar. The temperature of the operating medium includes all values and sub values there between, especially including 250, 300, 350, 400, 450, 500, 550, 600, 650, 700, 750° C.

In the case of steam as an operating medium, i.e. particularly when the vapour feed pipe is connected to a steam source, it proves to be particularly advantageous if the milling or inlet nozzles are connected to a vapour feed pipe which is equipped with expansion bends.

Furthermore, it has proved to be advantageous if the surface of the jet mill has as small a value as possible and/or the flow paths are at least substantially free of projections and/or if the components of the jet mill are designed for avoiding accumulations. By these measures, deposition of the material to be milled in the mill can additionally be prevented.

The invention is explained in more detail merely by way of example with reference to the below-described preferred and special embodiments of the process according to the invention and the preferred and particularly suitable versions of jet mills and the drawings and descriptions of the drawings, i.e. it is not limited to these working examples and use examples or to the respective combinations of features within individual working examples.

Individual features which are stated and/or shown in relation to specific working examples are not limited to these working examples or the combination with the other features of these working examples but can be combined, within the technical possibilities, with any other variants, even if they are not separately discussed in the present documents.

Identical reference numerals in the individual figures and images of the drawings designate identical or similar components or components having an identical or similar effect. The diagrams in the drawing also clarify those features which are not provided with reference numerals, regardless of whether such features are described below or not. On the other hand, features which are contained in the present description but not visible or shown in the drawing, are also readily understandable for a person skilled in the art.

As already indicated above, a jet mill, preferably an opposed jet mill, comprising integrated classifier, preferably an integrated dynamic air classifier, can be used for the production of very fine particles in the process according to the invention. Particularly preferably, the air classifier contains a classifying wheel and a classifying wheel shaft and a classifier housing, a classifier gap being formed between the classifying wheel and the classifier housing and a shaft lead-through being formed between the classifying wheel shaft and the classifier housing, and is operated in such a way that flushing of classifier gap and/or shaft lead-through with compressed gases of low energy is effected.

Preferably, the flushing gas is used at a pressure of not more than at least approximately 0.4 bar, particularly preferably not more than at least about 0.3 bar and in particular not more than about 0.2 bar above the internal pressure of the mill. The internal pressure of the mill may be at least about in the range from 0.1 to 0.5 bar.

Furthermore, it is preferable if the flushing gas is used at a temperature of about 80 to about 120° C., in particular approximately 100° C., and/or if the flushing gas used is low-energy compressed air, in particular at about 0.3 bar to about 0.4 bar.

The speed of a classifying rotor of the air classifier and the internal amplification ratio can be chosen or set or can be regulatable so that the circumferential speed of the operating medium (B) at a dip tube or outlet nozzle coordinated with the classifying wheel reaches up to 0.8 times the sound velocity of the operating medium.

This can be further developed if the speed of a classifying rotor of the air classifier and the internal amplification ratio are chosen or set or are regulatable so that the circumferential speed of the operating medium (B) at the dip tube or outlet nozzle reaches up to 0.7 times and particularly preferably up to 0.6 times the sound velocity of the operating medium.

In particular, it is furthermore possible advantageously to ensure that the classifying rotor has a height clearance which increases with decreasing radius, that area of the classifying rotor through which flow takes place preferably being at least approximately constant. Alternatively or in addition, it may be advantageous if the classifying rotor has an interchangeable, corotating dip tube. In an even further variant, it is preferable to provide a fines outlet chamber which has a widening cross section in the direction of flow.

Furthermore, the jet mill according to the invention can advantageously contain in particular an air classifier which contains the individual features or combinations of features of the wind classifier according to EP-A-472930. The entire disclosure content of EP-A-472930 is hereby fully incorporated by reference in order to avoid simply adopting identical subject matter. In particular, the air classifier may contain means for reducing the circumferential components of flow according to EP-A-472930. It is possible in particular to ensure that an outlet nozzle which is coordinated with the classifying wheel of the air classifier and is in the form of a dip tube has, in the direction of flow, a widening cross section which is preferably designed to be rounded for avoiding eddy formations.

Preferred and/or advantageous embodiments of the milling system which can be used in the process according to the invention or of the mill are evident from FIGS. 1 to 5 and the associated description, it once again being emphasized that these embodiments merely explain the invention in more detail by way of example, i.e. said invention is not limited to these working examples and use examples or to the respective combinations of features within individual working examples.

Individual features which are stated and/or shown in relation to specific working examples are not limited to these working examples or the combination with the other features of these working examples but can be combined within the technical possibilities with any other variants, even if they are not separately discussed in the present documents.

Identical reference numerals in the individual figures and images of the drawings designate identical or similar components and components having an identical or similar effect. The diagrams in the drawing also clarify those features which are not provided with reference numerals, regardless of whether such features are described below or not. On the other hand, features which are contained in the present description but aren't visible or shown in the drawing are also readily understandable for a person skilled in the art.

FIG. 1 shows a working example of a jet mill 1 comprising a cylindrical housing 2, which encloses a milling chamber 3, a feed 4 of material to be grinded (milled), approximately at half the height of the milling chamber 3, at least one milling jet inlet 5 in the lower region of the milling chamber 3 and a product outlet 6 in the upper region of the milling chamber 3. Arranged there is an air classifier 7 having a rotatable classifying wheel 8 with which the milled material (not shown) is classified in order to remove only milled material below a certain particle size through the product outlet 6 from the milling chamber 3 and to feed milled material having a particle size above the chosen value to a further milling process.

The classifying wheel 8 may be a classifying wheel which is customary in air classifiers and the blades of which (cf. below, for example in relation to FIG. 5) bound radial blade channels, at the outer ends of which the classifying air enters and particles of relatively small particle size or mass are entrained to the central outlet and to the product outlet 6 while larger particles or particles of greater mass are rejected under the influence of centrifugal force. Particularly preferably, the air classifier 7 and/or at least the classifying wheel 8 thereof are equipped with at least one design feature according to EP-A-472930.

It is possible to provide only one milling jet inlet 5, for example consisting of a single, radially directed inlet opening or inlet nozzle 9, in order to enable a single milling jet 10 to meet, at high energy, the particles of material to be milled which reach the region of the milling jet 10 from the feed 4 of material to be grinded (milled), and to divide the particles of material to be milled into smaller particles which are taken in by the classifying wheel 8 and, if they have reached an appropriately small size or mass, are transported to the outside through the product outlet 6. However, a better effect is achieved with milling jet inlets 5 which are diametrically opposite one another in pairs and form two milling jets 10 which strike one another and result in more intense particle division than is possible with only one milling jet 10, in particular if a plurality of milling jet pairs are produced.

Preferably two or more milling jet inlets, preferably milling nozzles, in particular 3, 4, 5, 6, 7, 8, 9, 10, 11 or 12 milling jet inlets, which are arranged in the lower third of the preferably cylindrical housing of the milling chamber, are used. These milling jet inlets are ideally arranged distributed in a plane and uniformly over the circumference of the milling container so that the milling jets all meet at one point in the interior of the milling container. Particularly preferably, the inlets or nozzles are distributed uniformly over the circumference of the milling container. In the case of three milling jets, this would be an angle of 120° between the respective inlets or nozzles. In general, it may be said that the larger the milling chamber, the more inlets or milling nozzles are used.

In a preferred embodiment of the process according to the invention, the milling chamber can, in addition to the milling jet inlets, contain heating openings or nozzles 5a, preferably in the form of heating nozzles, through which hot gas can be passed into the mill in the heat-up phase. These nozzles or openings can—as already described above—be arranged in the same plane as the milling openings or nozzles 5. One heating opening or nozzle 5a, but preferably also a plurality of heating openings or nozzles 5a, particularly preferably 2, 3, 4, 5, 6, 7 or 8 heating openings or nozzles 5a, may be present.

In a very particularly preferred embodiment, the mill contains two heating nozzles or openings and three milling nozzles or openings.

For example, the processing temperature can furthermore be influenced by using an internal heating source 11 between feed 4 of material to be (grinded) milled and the region of the milling jets 10 or a corresponding heating source 12 in the region outside the feed 4 of material to be grinded (milled), or by processing particles of material to be milled which is in any case already warm and avoids heat losses in reaching the feed 4 of material to be grinded (milled), for which purpose a feed tube 13 is surrounded by a temperature-insulating jacket 14. The heating source 11 or 12, if it is used, can in principle be of any desired form and therefore usable for the particular purpose and chosen according to availability on the market so that further explanations in this context are not required.

In particular, the temperature of the milling jet or of the milling jets 10 is relevant to the temperature, and the temperature of the material to be milled should at least approximately correspond to this milling jet temperature.

For the formation of the milling jets 10 introduced through milling jet inlets 5 into the milling chamber 3, superheated steam is used in the present working example. It is to be assumed that the heat content of the steam after the inlet nozzle 9 of the respective milling jet inlet 5 is not substantially lower than before this inlet nozzle 9. Because the energy necessary for impact comminution is to be available primarily as flow energy, the pressure drop between the inlet 15 of the inlet nozzle 9 and the outlet 16 thereof will be considerable in comparison (the pressure energy will be very substantially converted into flow energy) and the temperature drop too will not be inconsiderable. This temperature drop in particular should be compensated by the heating of the material to be milled, to such an extent that material to be milled and milling jet 10 have the same temperature in the region of the centre 17 of the milling chamber 3 when at least two milling jets 10 meet one another or in the case of a multiplicity of two milling jets 10.

Regarding the design of and procedure for preparing the milling jet 10 comprising superheated steam, in particular in the form of a closed system, reference is made to DE 198 24 062 A1, the complete disclosure content of which in this regard is hereby incorporated by reference in order to avoid simply adopting identical subject matter. For example, milling of hot slag as material to be milled is possible with optimum efficiency by a closed system.

In FIG. 1 of the jet mill 1, any feed of an operating medium B is typified by a reservoir or generation device 18, which represents, for example, a tank 18a, from which the operating medium B is passed via pipe devices 19 to the milling jet inlet 5 or the milling jet inlets 5 to form the milling jet 10 or the milling jets 10.

In particular, starting from a jet mill 1 equipped with an air classifier 7, the relevant working examples being intended and understood herein only as exemplary and not as limiting, a process for producing very fine particles is carried out with this jet mill 1 using an integrated dynamic air classifier 7. Apart from the fact that the milling phase is preceded by a heat-up phase in which all parts which come into contact with the vapour are heated to a temperature above the dew point of the vapour and the fact that a preferably integrated classifier is used, the innovation compared with conventional jet mills is that the speed of the classifying rotor or classifying wheel 8 of the air classifier 7 and the internal amplification ratio are preferably chosen, set or regulated so that the circumferential speed of an operating medium B at a dip tube or outlet nozzle 20 coordinated with the classifying wheel 8 reaches up to 0.8 times, preferably up to 0.7 times and particularly preferably up to 0.6 times the sound velocity of the operating medium B.

With reference to the previously explained variant with superheated steam as operating medium B or as an alternative thereto, it is particularly advantageous to use, as operating medium, gases or vapours B which have a higher and in particular substantially higher sound velocity than air (343 m/s). Specifically, gases or vapours B which have a sound velocity of at least 450 m/s are used as operating medium. This substantially improves the production and the yield of very fine particles compared with processes using other operating media, as are conventionally used according to practical knowledge, and hence optimizes the process overall.

A fluid, preferably the abovementioned steam, but also hydrogen gas or helium gas, is used as operating medium B.

In a preferred embodiment, the jet mill 1, which is in particular a fluidized-bed jet mill or a dense-bed jet mill or a spiral jet mill, is formed or designed with the integrated dynamic air classifier 7 for producing very fine particles or provided with suitable devices so that the speed of the classifying rotor or classifying wheel 8 of the air classifier 7 and the internal amplification ratio are chosen or set or regulatable or controllable so that the circumferential speed of the operating medium B at the dip tube or outlet nozzle 20 reaches up to 0.8 times, preferably up to 0.7 times and particularly preferably up to 0.6 times the sound velocity of the operating medium B.

Furthermore, the jet mill 1 is preferably equipped with a source, for example the reservoir or generation device 18 for steam or superheated steam or another suitable reservoir or generation device, for an operating medium B, or such an operating medium source is coordinated with it, from which, for operation, an operating medium B is fed at a higher and in particular substantially higher sound velocity than air (343 m/s), such as, preferably, a sound velocity of at least 450 m/s. This operating medium source, such as, for example, the reservoir or generation device 18 for steam or superheated steam, contains gases or vapours B for use during operation of the jet mill 1, in particular the abovementioned steam but hydrogen gas and helium gas are also preferred alternatives.

Particularly with the use of hot steam as operating medium B, it is advantageous to provide pipe devices 19 which are equipped with expansion bends (not shown), and are then also to be designated as vapour feed pipe, to the inlet or milling nozzles 9, i.e. preferably when the vapour feed pipe is connected to a steam source as a reservoir or generation device 18.

A further advantageous aspect in the use of steam as operating medium B consists in providing the jet mill 1 with a surface which is as small as possible, or in other words in optimizing the jet mill 1 with regard to as small a surface as possible. Particularly in relation to steam as operating medium B, it is particularly advantageous to avoid heat exchange or heat loss and hence energy loss in the system. This purpose is also served by the further alternative or additional design measures, namely designing the components of the jet mill 1 for avoiding accumulations or optimizing said components in this respect. This can be realized, for example, by using flanges which are as thin as possible in the pipe devices 19 and for connection of the pipe devices 19.

Energy loss and also other flow-relevant adverse effects can furthermore be suppressed or avoided if the components of the jet mill 1 are designed or optimized for avoiding condensation. Even special devices (not shown) for avoiding condensation may be present for this purpose. Furthermore, it is advantageous if the flow paths are at least substantially free of projections or optimized in this respect. In other words, the principle of avoiding as much as possible or everything which can become cold and where condensation may therefore arise is implemented by these design variants individually or in any desired combinations.

Furthermore, it is advantageous and therefore preferable if the classifying rotor has a height clearance increasing with decreasing radius, i.e. towards its axis, in particular that area of the classifying rotor through which flow takes place being at least approximately constant. Firstly or alternatively, it is possible to provide a fines outlet chamber which has a widening cross section in the direction of flow.

A particularly preferred embodiment in the case of the jet mill 1 consists in the classifying rotor 8 having an interchangeable, co-rotating dip tube 20.

Further details and variants of preferred designs of the jet mill 1 and its components are explained below with reference to FIGS. 4 and 5.

The jet mill 1 preferably contains, as shown in the schematic diagram in FIG. 4, an integrated air classifier 7 which is, for example in the case of designs of the jet mill 1 as a fluidized-bed jet mill or as a dense-bed jet mill or as a spiral jet mill, a dynamic air classifier 7 which is advantageously arranged in the centre of the milling chamber 3 of the jet mill 1. Depending on the volume flow rate of milling gas and classifier speed, the desired fineness of the material to be milled can be influenced.

In the air classifier 7 of the jet mill 1 according to FIG. 4, the entire vertical air classifier 7 is enclosed by a classifier housing 21 which substantially comprises the upper part 22 of the housing and the lower part 23 of the housing. The upper part 22 of the housing and the lower part 23 of the housing are provided at the upper and lower edge, respectively with in each case an outward-directed circumferential flange 24 and 25, respectively. The two circumferential flanges 24, 25 are present one on top of the other in the installation or operational state of the air classifier 8 and are fixed by suitable means to one another. Suitable means for fixing are, for example, screw connections (not shown). Clamps (not shown) or the like can also serve as detachable fixing means.

At virtually any desired point of the flange circumference, two circumferential flanges 24 and 25 are connected to one another by a joint 26 so that, after the flange connecting means have been released, the upper part 22 of the housing can be swivelled upwards relative to the lower part 23 of the housing in the direction of the arrow 27 and the upper part 22 of the housing is accessible from below and the lower part 23 of the housing from above. The lower part 23 of the housing in turn is formed in two parts and substantially comprises the cylindrical classifier chamber housing 28 with the circumferential flange 25 at its upper open end and a discharge cone 29 which tapers conically downwards. The discharge cone 29 and the classifier chamber housing 28 rest one on top of the other with flanges 30, 31 at the upper and lower end, respectively, and the two flanges 30, 31 of discharge cone 29 and classifier chamber housing 28 are connected to one another by detachable fixing means (not shown) like the circumferential flanges 24, 25. The classifier housing 21 assembled in this manner is suspended in or from support arms 28a, a plurality of which are distributed as far as possible uniformly spaced around the circumference of the classifier or compressor housing 21 of the air classifier 7 of the jet mill 1 and grip the cylindrical classifier chamber housing 28.

A substantial part of the housing internals of the air classifier 7 is in turn the classifying wheel 8 having an upper cover disc 32, having a lower cover disc 33 axially a distance away and on the outflow side and having blades 34 of expedient contour which are arranged between the outer edges of the two cover discs 32 and 33, firmly connected to these and distributed uniformly around the circumference of the classifying wheel 8. In the case of this air classifier 7, the classifying wheel 8 is driven via the upper cover disc 32 while the lower cover disc 33 is the cover disc on the outflow side. The mounting of the classifying wheel 8 comprises a classifying wheel shaft 35 which is positively driven in an expedient manner, is led out of the classifier housing 21 at the upper end and, with its lower end inside the classifier housing 21, supports the classifying wheel 8 non-rotatably in an overhung bearing. The classifying wheel shaft 35 is led out of the classifier housing 21 in a pair of worked plates 36, 37 which close the classifier housing 21 at the upper end of a housing end section 38 in the form of a truncated cone at the top, guide the classifying wheel shaft 35 and seal this shaft passage without hindering the rotational movements of the classifying wheel shaft 35. Expediently, the upper plate 36 can be coordinated in the form of a flange non-rotatably with the classifying wheel shaft 35 and supported non-rotatably via rotary bearing 35a on the lower plate 37, which in turn is coordinated with a housing end section 38. The underside of the cover disc 33 on the outflow side is in the common plane between the circumferential flanges 24 and 25 so that the classifying wheel 8 is arranged in its totality within the hinged upper part 22 of the housing. In the region of the conical housing end section 38, the upper part 22 of the housing also has a tubular product feed nozzle 39 of the feed 4 of material to be grinded (milled), the longitudinal axis of which product feed nozzle is parallel to the axis 40 of rotation of the classifying wheel 8 and its drive or classifying wheel shaft 35 and which product feed nozzle is arranged radially outside on the upper part 22 of the housing, as far as possible from this axis 40 of rotation of the classifying wheel 8 and its drive or classifying wheel shaft 35.

In a particularly preferred embodiment according to FIGS. 2 and 3, the integrated dynamic air classifier 1 contains a classifying wheel 8 and a classifying wheel shaft 35 and a classifier housing, as was already explained. A classifier gap 8a is defined between the classifying wheel 8 and the classifier housing 21, and a shaft lead-through 35b is formed between the classifying wheel shaft and the classifier housing 21 (cf. in this context FIGS. 2 and 3). In particular, starting from a jet mill 1 equipped with such an air classifier 7, the relevant working examples being understood here as being only exemplary and not limiting, a process for producing very fine particles is carried out using this jet mill 1, comprising an integrated dynamic air classifier 7. In addition to the fact that the milling chamber is heated before the milling phase to a temperature above the dew point of the vapour, the innovation compared with conventional jet mills consists in flushing of classifier gap 8a and/or shaft lead-through 35b with compressed gases of low energy. The peculiarity of this design is precisely the combination of the use of these compressed low-energy gases with the high-energy superheated steam, with which the mill is fed through the milling jet inlets, in particular milling nozzles or milling nozzles present therein. Thus, high-energy media and low-energy media are simultaneously used.

In the embodiment according to both FIGS. 4 and 5 on the one hand and 2 and 3 on the other hand, the classifier housing 21 receives the tubular outlet nozzle 20 which is arranged axially identically with the classifying wheel 8 and rests with its upper end just below the cover disc 33 of the classifying wheel 8, which cover disc is on the outflow side, but without being connected thereto. Mounted axially in coincidence at the lower end of the outlet nozzle 20 in the form of a tube is an outlet chamber 41 which is likewise tubular but the diameter of which is substantially larger than the diameter of the outlet nozzle 20 and in the present working example is at least twice as large as the diameter of the outlet nozzle 20. A substantial jump in diameter is therefore present at the transition between the outlet nozzle 20 and the outlet chamber 41. The outlet nozzle 20 is inserted into an upper cover plate 42 of the outlet chamber 41. At the bottom, the outlet chamber 41 is closed by a removable cover 43. The assembly comprising outlet nozzle 20 and outlet chamber 41 is held in a plurality of support arms 44 which are distributed uniformly in a star-like manner around the circumference of the assembly, connected firmly at their inner ends in the region of the outlet nozzle 20 to the assembly and fixed with their outer ends to the classifier housing 21.

The outlet nozzle 20 is surrounded by a conical annular housing 45, the lower, larger external diameter of which corresponds at least approximately to the diameter of the outlet chamber 41 and the upper, smaller external diameter of which corresponds at least approximately to the diameter of the classifying wheel 8. The support arms 44 end at the conical wall of the annular housing 45 and are connected firmly to this wall, which in turn is part of the assembly comprising outlet nozzle 20 and outlet chamber 41.

The support arms 44 and the annular housing 45 are parts of the flushing air device (not shown), the flushing air preventing the penetration of material from the interior of the classifier housing 21 into the gap between the classifying wheel 8 or more exactly the lower cover disc 3 thereof and the outlet nozzle 20. In order to enable this flushing air to reach the annular housing 45 and from there the gap to be kept free, the support arms 44 are in the form of tubes, with their outer end sections led through the wall of the classifier housing 21 and connected via an intake filter 46 to a flushing air source (not shown). The annular housing 45 is closed at the top by a perforated plate 47 and the gap itself can be adjustable by an axially adjustable annular disc in the region between perforated plate 47 and lower cover disc 33 of the classifying wheel 8.

The outlet from the outlet chamber 41 is formed by a fines discharge tube 48 which is led from the outside into the classifier housing 21 and is connected tangentially to the outlet chamber 41. The fines discharge tube 48 is part of the product outlet 6. A deflection cone 49 serves for cladding the entrance of the fines discharge tube 48 at the outlet chamber 41.

At the lower end of the conical housing end section 38, a classifying air entry spiral 50 and a coarse material discharge 51 are coordinated in horizontal arrangement with the housing end section 38. The direction of rotation of the classifying air entry spiral 50 is in the opposite direction to the direction of rotation of the classifying wheel 8. The coarse material discharge 51 is detachably coordinated with the housing end section 38, a flange 52 being coordinated with the lower end of the housing end section 38 and a flange 53 with the upper end of the coarse material discharge 51, and both flanges 52 and 53 in turn being detachably connected to one another by known means when the air classifier 7 is ready for operation.

The dispersion zone to be designed is designated by 54. Flanges worked (bevelled) on the inner edge, for clean flow, and a simple lining are designated by 55.

Finally, an interchangeable protective tube 56 is also mounted as a closure part on the inner wall of the outlet nozzle 20, and a corresponding interchangeable protective tube 57 can be mounted on the inner wall of the outlet chamber 41.

At the beginning of operation of the air classifier 7 in the operating state shown, classifying air is introduced via the classifying air entry spiral 50 into the air classifier 7 under a pressure gradient and with an entry velocity chosen according to the purpose. As a result of introducing the classifying air by means of a spiral, in particular in combination with the conicity of the housing end section 38, the classifying air rises spirally upwards in the region of the classifying wheel 8. At the same time, the "product" comprising solid particles of different mass is introduced via the product feed nozzle 39 into the classifier housing 21. Of this product, the coarse material, i.e. the particle fraction having a greater mass, moves in a direction opposite to the classifying air into the region of the coarse material discharge 51 and is provided for further processing. The fines, i.e. the particle fraction having a lower mass, is mixed with the classifying air, passes radially from the outside inwards through the classifying wheel 8 into the outlet nozzle 20, into the outlet chamber 41 and finally via a fines outlet tube 48 into a fines outlet 58, and from there into a filter in which the operating medium in the form of a fluid, such as, for example air, and fines are separated from one another. Coarser constituents of the fines are removed radially from the classifying wheel 8 by centrifugal force and mixed with the coarse material in order to leave the classifier housing 21 with the coarse material or to circulate in the classifier housing 21 until it has become fines having a particle size such that it is discharged with the classifying air.

Owing to the abrupt widening of the cross section from the outlet nozzle 20 to the outlet chamber 41, a substantial reduction in the flow velocity of the fines/air mixture takes place there. This mixture will therefore pass at a very low flow velocity through the outlet chamber 41 via the fines outlet tube 48 into the fines outlet 58 and produce only a small amount of abraded material on the wall of the outlet chamber 41. For this reason, the protective tube 57 is also only a very precautionary measure. The high flow velocity in the classifying wheel 8 for reasons relating to a good separation technique, also prevails, however, in the discharge or outlet nozzle 20, and the protective tube 56 is therefore more important than the protective tube 57. Particularly preferred is the jump in diameter with a diameter increase at the transition from the outlet nozzle 20 into the outlet chamber 41.

The air classifier 7 can besides in turn be readily maintained as a result of the subdivision of the classifier housing 21 in the manner described and the coordination of the classifier components with the individual part-housings, and components which have become damaged can be changed with relatively little effort and within short maintenance times.

While the classifying wheel 8 with the two cover discs 32 and 33 and the blade ring 59 arranged between them and having the blades 34 is shown in the schematic diagram of FIGS. 4 and 2 in the already known, customary form with parallel cover discs 32 and 33 having parallel surfaces, the classifying wheel 8 is shown in FIGS. 5 and 3 for a further working example of the air classifier 7 of an advantageous further development.

This classifying wheel 8 according to FIGS. 5 and 3 contains, in addition to the blade ring 59 with the blades 34, the upper cover disc 32 and the lower cover disc 33 an axial distance away therefrom and located on the outflow side, and is rotatable about the axis 40 of rotation and thus the longitudinal axis of the air classifier 7. The diametral dimension of the classifying wheel 8 is perpendicular to the axis 40 of rotation, i.e. to the longitudinal axis of the air classifier 7, regardless of whether the axis 40 of rotation and hence said longitudinal axis are perpendicular or horizontal. The lower cover disc 33 on the outflow side concentrically encloses the outlet nozzle 20. The blades 34 are connected to the two cover discs 33 and 32. The two cover discs 32 and 33 are now, in contrast to the prior art, conical, preferably such that the distance of the upper cover disc 32 from the cover disc 33 on the outflow side increases from the ring 59 of blades 34 inwards, i.e. towards the axis 40 of rotation, and does so preferably continuously, such as, for example, linearly or non-linearly, and more preferably so that the area of the cylinder jacket through which flow takes place remains approximately constant for every radius between blade outlet edges and outlet nozzle 20. The outflow velocity which decreases owing to the decreasing radius in known solutions remains at least approximately constant in this solution.

In addition to that variant of the design of the upper cover disc 32 and of the lower cover disc 33 which is explained above and in FIGS. 5 and 3, it is also possible for only one of these two cover discs 32 or 33 to be conical in the manner explained and for the other cover disc 33 or 32 to be flat, as is the case for both cover discs 32 and 33 in relation to the working example according to FIG. 4. In particular, the shape of the cover disc which does not have parallel surfaces can be such that the area of the cylinder jacket through which flow takes place remains at least approximately constant for every radius between blade outlet edges and outlet nozzle 20.

Particular preferably, the diameter of the grinding nozzles is of from 2 to 11 mm, the nozzle type is Laval, the number of nozzles is of from 3 to 5, the internal mill pressure is of from 0.8 to 1.5 bar(abs.), the grinding medium entry pressure is of from 12 to 300 bar (abs.), the grinding medium entry temperature is of from 190 to 600° C., the grinding medium mill exit temperature is of from 105 to 250° C., the classifier speed is of from 100 to 6000 min$^{-1}$, the outlet port diameter (immersed pipe diameter) is of from 100 to 500 mm.

Besides the precipitated silica as an essential compound the thermal insulation material may further comprise an opacifier material. The opacifier material may be selected from carbon black, iron oxide, iron titanium oxide, titanium dioxide, zirconium silicate, zirconium oxide, silicon carbide and mixtures thereof. Preference is given to carbon black, comprising lamp black, furnace black, gas black, channel black and/or thermal black. The BET surface area of the carbon black preferably is from 10 to 400 m$^2$/g, more preferably from 20 to 200 m$^2$/g.

In a special embodiment the thermal insulation material according to the invention may comprise up to 70 wt.-% of the opacifier material. Preferably the thermal insulation material comprises 5 to 70 wt.-% of the opacifier material, based on the thermal insulation material.

In a further embodiment of the invention the thermal insulation material comprises particulate insulating filler material other than the precipitated silica having a modified tapped density of less than or equal to 70 g/l. The particulate insulating filler material may be selected from vermiculite, perlite, flyash, volatilised silica, fumed silica, precipitated silica and mixtures thereof. The amount of particulate insulating filler material is from 0 to 50 wt.-%, based on the thermal insulation material.

In a further embodiment of the invention the thermal insulation material comprises a binder material. This may be either an organic binder, for example polyvinyl alcohol, or polyurethane or may be an inorganic binder, for example selected from sodium silicate, potassium silicate, aluminium orthophosphate, and mixtures thereof. The amount of binder material is from 0 to 70 wt.-%, based on the thermal insulation material.

Preferably the thermal insulation material according to the invention displays a thermal conductivity at a mean temperature of 300K of less than 0.05 W/mK, more preferably 0.001 to 0.02 W/mK, at a reduced gas pressure, i.e. 0.01-100 mbar.

A further object of the invention is the use of the thermal insulation material as loose filled thermal insulation, sheets or blocks, for example pipe-in-pipe insulation, such as for exhaust pipe systems, furnace cavities, double skin linings, areas over arched roofs, open joints and for levelling furnace bottoms and hearths, in vacuum isolation systems.

EXAMPLES

The physical/chemical data of the precipitated silica used in the thermal insulation material of the invention were determined by the following methods:

The BET surface area was measured following ISO 9277. The procedure was used to determine the specific N2 surface area of silicas and silicates according to the BET procedure. With the method described here the measured value was determined by cryogenic adsorption of nitrogen at well defined partial pressures. The analysis was accomplished as multipoint determination and showed in the partial pressure range (p/p0) of 0.05-0.2 with measuring of altogether 5 points a linear behaviour.

The Loss on Drying (LOD) was determined following ISO 787-2: A weighing bottle with the stopper removed was heated in the oven at 105° C. for at least 1 h. After cooling in the desiccator and inserting the stopper it was weighed (at least) to the nearest 0.01 g on a precision balance. 10+1 g of the sample were spread in a uniform layer on the bottom of the weighing bottle. The stopper was inserted again and the filled weighing bottle was weighed with a accuracy of 0.01 g (m$_{sp}$). The weighing bottle was opened cautiously and heated with the stopper (removed) in the oven at 105+2° C. for 2 h. Thereafter the weighing bottle was slowly closed with the stopper and allow to cool in a desicator. The weighing bottle was weighed with an accuracy of 0.01 g (m$_{LOD}$). The test result was given with 1 decimal place; values of as less than 0.1% were reported as "<0.1".

$$LOD[wt.\text{-}\%]=(m_{sp}-m_{LOD})\times 10/m_{sp}, m_{sp}=\text{weight of original sample[g]},$$

m$_{LOD}$=weight of residue after loss on drying [g].

Determination of Loss on Ignition (LOI): 1 g of silica original sample material was weighed accurately (m$_{sp}$) in a tared platinum crucible and was heated at 1000° C. for 2 h. After cooling down in a desicator in presence of P$_2$O$_5$ the crucible was weighed again. The weight after loss on ignition (m$_{LOI}$) was calculated.

The loss of ignition (LOI) was given by the equation:

$$LOI[wt.\text{-}\%]=[(m_{sp}-m_{LOI})/m_{sp}]\times 100, m_{sp}=\text{weight of original sample[g]},$$

m$_{LOI}$=weight of sample after loss on ignition [g]

Determining the Modified Tapped Density

With the "conventional" tapped density determination of DIN EN ISO 787-11, the result can be falsified by the fact that the silica had already undergone preliminary compaction in the course, for example, of being packed. In order to rule this out, a "modified tapped density" was determined for the silicas of the present invention.

A porcelain suction filter (nominal size 110, diameter=12 cm, height=5.5 cm) fitted with a circular filter (e.g. type 598, Schleicher+Schull) was filled loosely with silica to approximately 1 cm from the top edge, and was covered with elastic film (Parafilm®). The shape and dimensions of the elastic film were to be selected such that it finishes very closely or completely flush with the edge of the porcelain suction filter unit. The unit was mounted on a suction bottle and then a vacuum of –0.7 bar was applied for a period of 5 minutes. In the course of this operation, the silica was compacted uniformly by virtue of the film under suction. Then air was cautiously readmitted and the resulting silica plaque was removed from the filter unit by being tipped forcefully into a porcelain dish.

The slightly pre-comminuted material was redispersed uniformly (in the manner of a silica/air aerosol) via a centrifugal mill (ZM1, Retsch, 0.5 mm screen insert, speed setting 1, without cyclone, without internal funnel insert) with an internal collecting dish (the silica (starting material) was introduced slowly—spatula by spatula—into the mill feed; the internal product collection dish should never become completely full). During this operation the power consumption of the mill should not exceed 3 amperes. This operation was less a conventional grinding than a defined loosening of the silica structure (of air-jet-milled silicas, for example), since the energy input here was substantially weaker than in the case of jet milling. 5 g of the resulting material were weighed out to an accuracy of 0.1 g into the 250 ml volumetric cylinder of the jolting volumeter (STAV 2003 from Engelsmann). In a method based on DIN ISO 787-11, after jolting 1250 times, the resulting volume of the silica, in ml, was read off on the scale.

Determining the silanol group density: First of all the moisture content of the silica sample was determined in accordance with the section "Determining the Moisture Content or Loss on Drying". Thereafter 2-4 g of the sample (to an accuracy of 1 mg) were transferred to a pressure-tight glass apparatus (glass flask with dropping funnel) with a pressure measurement means attached. In this apparatus it was dried under reduced pressure (<1 hPa) at 120° for 1 h. At room temperature then, approximately 40 ml of a degassed 2% strength solution of $LiAlH_4$ in diglyme was added dropwise from the dropping funnel. If appropriate, further solution was added dropwise until no further increase in pressure was observed. The increase in pressure as a result of the hydrogen evolved when the LiAlH4 reacts with the silanol groups of the silica was determined by way of pressure measurement (with the volume known as a result of calibration of the apparatus prior to measurement) to an accuracy of ≤1 hPa. From the increase in pressure it was possible, by calculation using the general gas equation, to work back to the silanol group concentration of the silica, taking into account the moisture content of the silica. The influence of the vapor pressure of the solvent should be corrected correspondingly. The silanol group density was calculated as follows:

Silanol group density=silanol group concentration/
BET surface area

Sears Number Determination:

The modified Sears number (hereinafter Sears number V2) was a measure of the number of free silanol groups and can be determined via titration of silica with potassium hydroxide solution in the range from pH 6 to pH 9.

The determination method was based on the following chemical reactions, and ≡SiOH was intended to symbolize a silanol group of the silica:

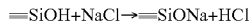

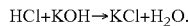

Method 10.00 g of a pulverulent, spherical or granular silica with moisture level of 5±1% were uniformly comminuted for 60 seconds, using an IKA M 20 universal mill (550 W; 20 000 rpm). If appropriate, the moisture content of the starting substance had to be adjusted via drying at 105° C. in a drying cabinet, or uniform wetting, and the comminution process repeated. 2.50 g of the resultant treated silica were weighed out at room temperature into a 250 ml titration vessel and mixed with 60.0 ml of methanol (analytical grade). Once the specimen had been completely wetted, 40.0 ml of deionized water were added, and an Ultra-Turrax T 25 stirrer (KV-18G stirrer shaft, diameter 18 mm) was used for dispersion for 30 seconds with rotation rate 18 000 rpm. 100 ml of deionized water were used to flush the specimen particles adhering to the edge of the vessel and to the stirrer into the suspension, and the temperature of the mixture was controlled to 25° C. in a waterbath with thermostat.

The pH measurement device (Knick 766 Calimatic pH meter with temperature sensor) and the pH electrode (Schott N7680 combination electrode) were calibrated by using buffer solutions (pH 7.00 and 9.00) at room temperature. The pH meter was first used to measure the starting pH value of the suspension at 25° C., and then, as a function of the result, potassium hydroxide solution (0.1 mol/l) or hydrochloric acid solution (0.1 mol/l) was used to adjust the pH value to 6.00. A dynamic titration method was selected with the following parameters: incremental titration volume Vmin=0.05 ml to Vmax=1.0 ml; waiting time between volume additions tmin=2.0 s to tmax=20.0 s. Consumption of KOH solution or of HCl solution in ml to pH 6.00 was V1'. 20.0 ml of sodium chloride solution (250.00 g of NaCl (analytical grade) made up to 1 l with deionized water) were then added. 0.1 mol/l of KOH was then used for titration to a pH value of 9.00. Consumption of KOH solution in ml to pH 9.00 was V2'.

The volumes V1' and, respectively, V2' were then first standardized to the theoretical starting weight of 1 g, and were multiplied by 5, to give V1 and the Sears number V2 in the units ml/(5 g).

Determining pH: The pH of the precipitated silica, as a 5% by weight aqueous suspension, was determined at room temperature in a method based on DIN EN ISO 787-9. In contrast to the specifications of the aforementioned standard, the initial masses were changed (5.00 g of silica to 100 ml of deionized water).

Determining the particle size distribution by means of laser diffraction: The particle distribution was determined in accordance with the principle of laser diffraction on a laser diffractometer (Horiba, LA-920).

First of all the silica sample was dispersed in 100 ml of water without additional dispersing additives in a 150 ml glass beaker (diameter: 6 cm) in such a way as to give a dispersion having a weight fraction of 1% by weight $SiO_2$. This dispersion was then dispersed using an ultrasonic probe (Dr. Hielscher UP400s, Sonotrode H7) for a duration of 5 minutes intensely (300 W, without pulsing). For this purpose the ultrasound probe was mounted such that its lower end was immersed to a distance of approximately 1 cm above the base of the glass beaker. Immediately following the dispersing operation the particle size distribution of a sample of the ultrasonicated dispersion was determined using a laser diffractometer (Horiba LA-920). For the evaluation, using the standard software supplied with the Horiba LA-920, a refractive index of 1.09 was selected. All measurements take place at room temperature. The particle size distribution and also the relevant variables such as, for example, the particle size $d_{50}$ and $d_{90}$ were automatically calculated and depicted in graph form by the instrument. Attention should be paid to the notes in the operating instructions.

Example 1

The commercially available precipitated silica Sipernat 160, from Evonik Degussa GmbH, physico-chemical data see Table 1, was subjected to ultrafine grinding on a steam-operated fluid-bed opposed-jet mill at a superatmospheric pressure. Details of the grinding system (mill) and of the grinding method used was given in the description above.

In preparation for actual grinding with superheated steam, a fluid-bed opposed-jet mill as shown in FIG. 1, with an integrated dynamic pneumatic classifier as shown in FIGS. 2 and 3, was first heated via the two heating openings or nozzles 5a (of which only one was shown in FIG. 1), which were charged with hot compressed air at 10 bar and 160° C., until the mill exit temperature was approximately 105° C.

For the separation of the ground material, a filter system was connected downstream of the mill (but not shown in FIG. 1), its filter housing being heated in the lower third indirectly via attached heating coils by means of 6 bar saturated steam, likewise for the purpose of preventing condensation. All of the apparatus surfaces in the region of the mill, the separating filter, and the supply lines for steam and hot compressed air have special insulation.

After the heating temperature had been reached, the supply of hot compressed air to the heating nozzles was shut off and the charging of the three grinding nozzles with the grinding medium of superheated steam was commenced.

In order to protect the filter means used in the separating filter, and also in order to set a defined level of residual water in the ground material (see Table 1), water was introduced in the starting phase and during grinding, into the grinding chamber of the mill, via a two-fluid nozzle operated with compressed air, as a function of the mill exit temperature. Details of the milling configuration were given in Table 2.

Product feed was commenced when the abovementioned operational parameters were constant. The feed quantity was regulated as a function of the current flow of the classifier engine. The current flow regulates the feed quantity such that it was not possible to exceed approximately 70% of the nominal current flow.

The introduction member (4) which functions here was a speed-regulated bucket wheel which meters the feed material from a reservoir container via a cyclical lock, which serves as a barometric endpoint, into the grinding chamber, which was at super atmospheric pressure.

The coarse material was comminuted in the expanding steam jets (grinding gas). Together with the depressurized grinding gas, the product particles ascend in the centre of the mill vessel to the classifying wheel. Depending on the classifier speed and grinding steam quantity which have been set, the particles whose fineness was sufficient enter along with the grinding steam into the fines exit, and from there they pass into the downstream separating system, while particles which were too coarse pass back into the grinding zone and were subjected to a repeat comminution. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determines the fineness of the particle-size distribution function and also the upper particle-size limit.

The material was ground to the particle size defined in Table 3 the $d_{50}$ and the $d_{90}$ value.

TABLE 1

| Physico-chemical data of Sipernat 160 | | |
|---|---|---|
| BET | m²/g | 183 |
| pH | — | 5.6 |
| Loss on drying | wt.-% | 2.9 |
| Loss on ignition | wt.-% | 3.2 |
| Sears number | ml/(5 g) | 11.8 |
| DBP | ml/100 g | 276 |

TABLE 2

| Operating parameters | | |
|---|---|---|
| grinding nozzle diameters | mm | 3.2 |
| nozzle type | | Laval |
| number of nozzles | units | 3 |
| internal mill pressure | bar(abs.) | 1.144 |
| grinding medium entry pressure | bar (abs.) | 37.0 |
| grinding medium entry temperature | ° C. | 348 |
| grinding medium mill exit temperature | ° C. | 124 |
| classifier speed | min⁻¹ | 4500 |
| current flow of the classifier engine | A % | 62 |
| outlet port diameter* | mm | 140 |
| silica | kg/h | 56 |

*immersed pipe diameter

TABLE 3

| Physico-chemical data of precipitated silica (Example 1) | | |
|---|---|---|
| BET | m²/g | 179 |
| pH | — | 6.4 |
| Loss on drying | wt.-% | 2.8 |
| Loss on ignition | wt.-% | 3.0 |
| Silanol group density | SiOH/nm² | 3.800 |
| Modified tapped density | g/l | 26 |
| $d_{90}$ value* | μm | 1.07 |
| $d_{50}$ value | μm | 0.385 |

*volume-based particle distribution

Example 2

Thermal insulation material 1: 90 parts by weight of the precipitated silica from Example 1 are mixed with 10 parts by weight of Carbon Black F 101, Evonik Degussa. The density of the thermal insulation material 1 is 146.2 kg/m²).

Thermal insulation material 2: 80 parts by weight of the precipitated silica from Example 1 are mixed with 20 parts by weight of Carbon Black F 101, Evonik Degussa. The density of the thermal insulation material 2 is 158 kg/m²), Thermal insulation material 3 (comparison): 90 parts by weight of fumed silica Aerosil® 300, Evonik Degussa, are mixed with 10 parts by weight of Carbon Black F 101, Evonik Degussa. The density of the thermal insulation material 3 is 126 kg/m².

Figure 6:
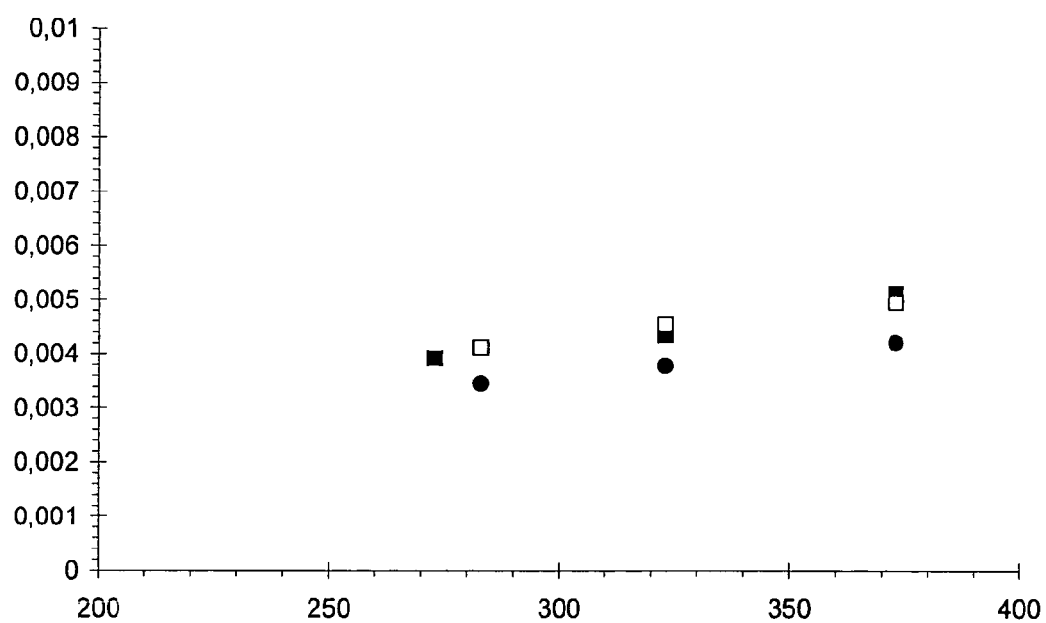
FIG. 6 shows a comparison of thermal conductivity of materials accoring to the invention to commercially available materials.

FIG. 6 shows the thermal conductivity in W/(mK) versus the temperature in K of the thermal insulation materials 1 to 3 in a vacuum (pGas <10-3 hPa) at an external pressure of 1047 mbar. It can clearly be seen that the thermal conductivity of the thermal insulation materials 1 [■] and 2 [□] comprising the precipitated silica is comparable to the one obtained by thermal insulation material 3 [●]. If the lower price for the precipitated silica is taken into consideration, the thermal insulation material according to the invention is an alternative to the insulation materials based on fumed silicas.

The invention claimed is:

1. A thermal insulation material, comprising:
   from 30 to 95% by weight of a comminuted and classified precipitated silica having a modified tapped density of 10 to 50 g/l; and
   from 5 to 70% by weight of opacifier material.

2. The material of claim 1, wherein
   a) a $d_{50}$-value of the precipitated silica is from 150 to 2000 nm,
   b) a $d_{90}$-value of the precipitated silica is from 500 to 7000 nm, and
   c) a silanol group density of the precipitated silica is from 2.5 to 8 OH/nm$^2$.

3. The material of claim 1, wherein a BET-surface area of the precipitated silica is from 100 to 350 m$^2$/g.

4. The material of claim 1, wherein the precipitated silica has at least one property selected from the group consisting of
   a loss on drying is from 1.5 to 8% by weight, and
   a loss on ignition is from 1.5 to 9% by weight.

5. The material of claim 1, wherein a pH-value of the precipitated silica is from 4 to 9.

6. The material of claim 1, wherein a content of the precipitated silica is from 40 to 80 wt.-% based on a weight of the thermal insulation material.

7. The material of claim 1, further comprising:
   a particulate insulating filler material.

8. The material of claim 7, wherein an amount of the particulate insulating filler material is from greater than 0 to 70 wt.-%, based on a weight of the thermal insulation material.

9. The material of claim 1, further comprising
   a binder material.

10. The material of claim 9, wherein an amount of the binder material is from greater than 0 to 70 wt.-%, based on a weight of the thermal insulation material.

11. The material of claim 1, wherein a thermal conductivity at a mean temperature of 300K of the precipitated silica is less than 0.05 W/mK at a reduced gas pressure.

12. A loose filled thermal insulation, a sheet, a block, or a vacuum isolation system, comprising the material of claim 1.

13. The material of claim 2, wherein a BET-surface area of the precipitated silica is from 100 to 350 m$^2$/g.

14. The material of claim 2, wherein
    the precipitated silica has at least one property selected from the group consisting of
    a loss on drying is from 1.5 to 8% by weight, and
    a loss on ignition is from 1.5 to 9% by weight.

15. The material of claim 3, wherein
    the precipitated silica has at least one property selected from the group consisting of
    a loss on drying is from 1.5 to 8% by weight, and
    a loss on ignition is from 1.5 to 9% by weight.

16. The material of claim 2, wherein the pH-value of the precipitated silica is from 4 to 9.

17. The material of claim 3, wherein the pH-value of the precipitated silica is from 4 to 9.

18. The material of claim 4, wherein the pH-value of the precipitated silica is from 4 to 9.

* * * * *